(12) United States Patent
Navarro et al.

(10) Patent No.: US 9,085,254 B2
(45) Date of Patent: Jul. 21, 2015

(54) HEAD RESTRAINT WITH TWO WING ELEMENTS

(75) Inventors: Daniel Navarro, Haguenau (FR);
Robert Braun, Daubensand (FR);
Thomas Dillinger, Ratingen (DE)

(73) Assignee: JOHNSON CONTROLS GMBH, Burscheid (DE)

( * ) Notice: Subject to any disclaimer, the term of this patent is extended or adjusted under 35 U.S.C. 154(b) by 114 days.

(21) Appl. No.: 13/819,802

(22) PCT Filed: Aug. 29, 2011

(86) PCT No.: PCT/EP2011/004316
§ 371 (c)(1),
(2), (4) Date: May 10, 2013

(87) PCT Pub. No.: WO2012/028284
PCT Pub. Date: Mar. 8, 2012

(65) Prior Publication Data
US 2013/0221722 A1      Aug. 29, 2013

(30) Foreign Application Priority Data

Sep. 2, 2010   (DE) .......................... 10 2010 044 246

(51) Int. Cl.
*B60N 2/48*   (2006.01)
(52) U.S. Cl.
CPC ......... *B60N 2/4882* (2013.01); *Y10T 29/49826* (2015.01)

(58) Field of Classification Search
CPC ...... A47C 7/38; A61G 15/125; B60N 2/4882; Y10T 29/49826
USPC .......................... 297/116, 406, 411.31, 411.37
See application file for complete search history.

(56) References Cited

U.S. PATENT DOCUMENTS

| | | | |
|---|---|---|---|
| 1,504,212 A | * | 8/1924 | Carlson .......................... 351/153 |
| 6,250,716 B1 | | 6/2001 | Clough |
| 7,631,935 B2 | * | 12/2009 | Chen et al. .................. 297/284.9 |

FOREIGN PATENT DOCUMENTS

| | | |
|---|---|---|
| DE | 2312050 A1 | 9/1974 |
| DE | 29707759 U1 | 7/1997 |
| DE | 102004049526 B3 | 11/2005 |
| DE | 10196653 B4 | 12/2005 |
| DE | 102004035428 A1 | 3/2006 |
| EP | 0152867 A2 | 8/1985 |
| GB | 07517 A | 4/1911 |
| KR | 10-2010-0042089 A | 4/2010 |
| WO | WO95/09742 A1 | 4/1995 |

OTHER PUBLICATIONS

International Preliminary Report on Patentability (IPRP) in PCT/EP2011/004316 dated Mar. 14, 2013.
Examination Report for German Application No. 10 2010 044 246.1, dated Jan. 28, 2011, 4 pages.
International Search Report for International Application No. PCT/EP2011/004316 and English translation, date of mailing Jan. 25, 2012, 8 pages.
Office Action dated Jul. 30, 2014, received in corresponding Korean Patent Application No. 10-2013-7008339, along with English translation, 7 pages.

* cited by examiner

*Primary Examiner* — Milton Nelson, Jr.
(74) *Attorney, Agent, or Firm* — Foley & Lardner LLP

(57) ABSTRACT

A head restraint includes a base element on which two wing elements are mounted by at least one hinge so as to rotate about a vertical axis. The hinge has a pin and a recess which are frustoconical. The support structure of each wing element is in two parts.

4 Claims, 1 Drawing Sheet

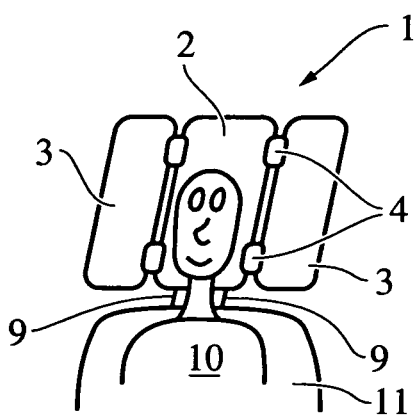
Fig. 1
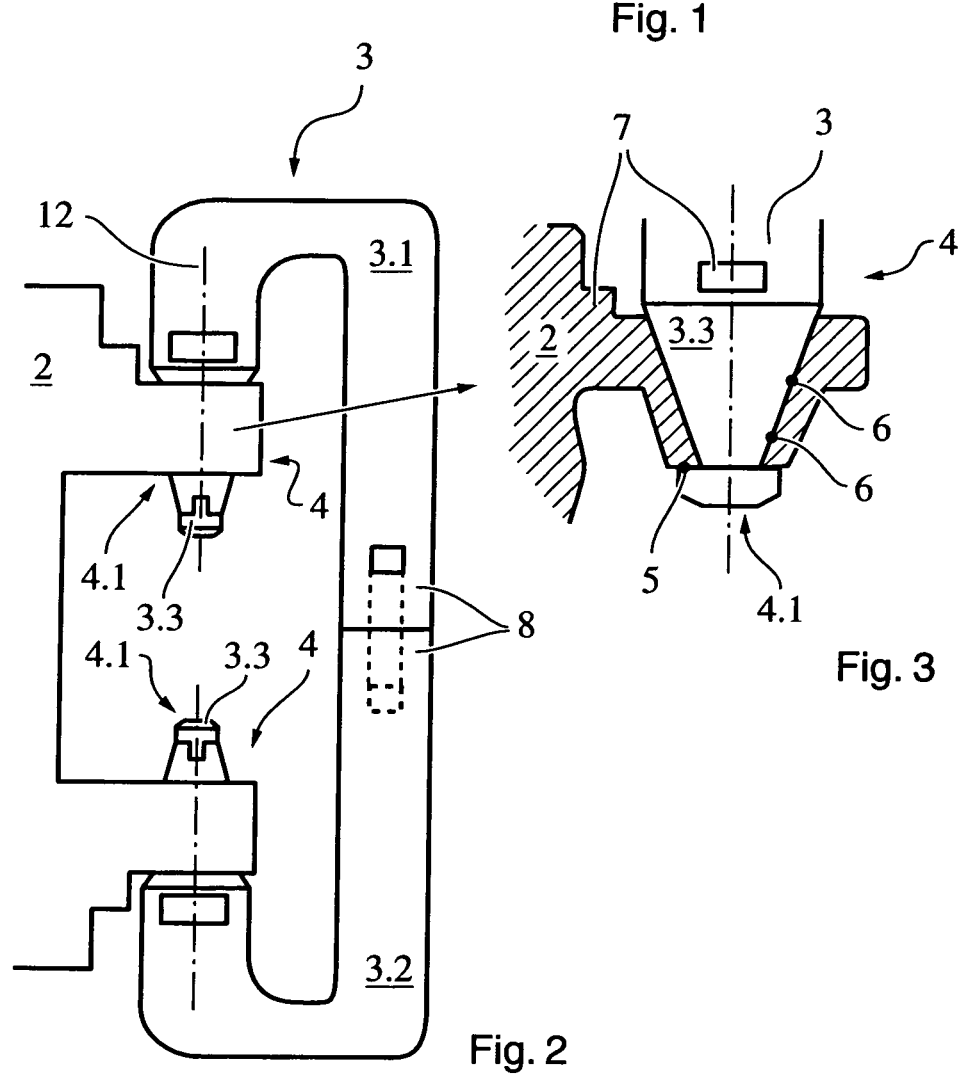
Fig. 3
Fig. 2

HEAD RESTRAINT WITH TWO WING ELEMENTS

CROSS REFERENCE TO RELATED APPLICATIONS

The present application is a National Stage of International Application No. PCT/EP2011/004316 filed on Aug. 29, 2011, which claims the benefit of German Patent Application No. 10 2010 044 246.1 filed on Sep. 2, 2010, the entire disclosures of which are incorporated herein by reference.

The present invention relates to a head restraint having a main element on which two wing elements are fitted so as to be rotatable about a vertically provided axis by means of at least one hinge.

Head restraints are known from the prior art for example in EP0152867. A person skilled in the art knows head restraints having a main element on which two wing elements are fitted so as to be rotatable from DE10196653 and WO95/09742. However, the head restraints known from the prior art have the disadvantage that they are constructed in a comparatively complicated manner and are thus relatively difficult to fit.

It was therefore the object of the present invention to provide a head restraint which does not have the disadvantages of the prior art.

The object is achieved by a head restraint having a main element on which two wing elements are fitted so as to be rotatable about a vertically provided axis by means of at least one hinge, wherein the hinge has a pin and a recess and the pin and the recess are provided in the form of a truncated cone.

The present invention relates to a head restraint which is arranged as a rule on the backrest of a motor vehicle seat. This motor vehicle seat can provide room for one or more persons. The motor vehicle seat can therefore also be a bench seat. Preferably, the head restraint is adjustable in height and/or in its inclination in order to be able to be adapted to the size of the body of the particular seat occupant.

According to the invention, the head restraint consists of a main element on which there is arranged preferably at least one holding rod, by means of which the main element is fastened to the backrest. Two wing elements are attached by means of hinges to the right- and left-hand side of this main element. As a result, the wing elements can be pivoted about a vertical axis, i.e. an axis that extends parallel to the backrest, and thus be moved toward or away from the head of the seat occupant, with the result that the stability of the head of the seat occupant, when he rests it against the head restraint, can be increased. The wing elements can also be pivoted into a stowed position in which they rest against the main element.

According to the invention, the hinge has a recess which receives a pin, wherein both the pin and the recess are provided at least in sections in the form of a truncated cone. As a result, the pin is guided not only radially but also axially at least in one spatial direction.

Preferably, two hinges are provided per wing element, said hinges particularly preferably being arranged in a manner aligned with one another. Preferably, the hinges are constructed in a substantially identical manner and very particularly preferably are provided mirror-symmetrically to one another.

In a preferred embodiment, in particular the pin has an axial stop, by way of which the pin is prevented from coming away from the recess by itself.

Preferably, there is sufficiently high friction between the pin and the recess, so that the wing elements are not displaced by themselves, at least under normal use forces. This can be achieved for example in that the outside diameter of the pin is provided to be greater than the inside diameter of the recess and/or in that the pin is pushed or pulled into the recess.

In a further preferred embodiment, the head restraint has a radial stop, which prevents the wing elements from turning more than a certain amount. This stop can be important in particular in the event of an accident, in order to prevent the wing elements from moving too far away from the head of the occupant. However, by way of the stop, other injury to a vehicle occupant can also be avoided.

The wing elements can be set in a multiplicity of positions in relation to the main element. For example, the wing elements can also be moved into a stowed position, in which they are arranged parallel to the main element, in particular resting against the latter.

In a preferred or further embodiment according to the invention of the head restraint according to the invention, each wing element has a support structure which is provided in two parts. Preferably, these two parts are connected together, preferably fitted together, during the fitting of the wing element on the main element. Very particularly preferably, fitting together takes place while or after the pin of the wing element is inserted into the recess in the main element.

Preferably, the head restraint has a securing means, by way of which the composite structure of the two parts of the wing element is secured after they have been fitted together.

A further subject of the present invention is a method for fitting a wing element, which is provided in two parts, on a main element, wherein the parts of the wing element are fitted on the main element and are connected together in the process or thereafter.

The method according to the invention has the advantage that the wing elements can be fastened very easily to the main element.

The invention is explained in the following text with reference to FIGS. 1 to 3. These explanations are merely by way of example and do not restrict the general concept of the invention. The explanations apply equally to all subjects of the present invention.

FIG. 1 shows the head restraint according to the invention.

FIG. 2 shows details of the wing element of the head restraint according to the invention.

FIG. 3 shows details of the hinge of the head restraint according to the invention.

FIG. 1 shows the head restraint 1 according to the invention, which is provided by means of holding rods 9 on the backrest 11 of a vehicle seat. The vehicle seat is occupied by a seat occupant 10. The head restraint according to the invention consists of a main element 2, on which the holding rods 9, by way of which the main element is fastened to the backrest, are provided. Preferably, the head restraint according to the invention is provided to be adjustable in height and/or in its inclination toward or away from the head of the seat occupant. According to the invention, the head support has in each case a wing element 3 on the right- and left-hand side of the main element 2, said wing element 3 being fitted on the main element 2 in each case by means of in each case two hinges 4. The two hinges 4 represent a vertical axis 12 about which the wing element is provided to be rotatable. Each wing element can be set into a multiplicity of positions. Very particularly preferably, the wing element can also be moved into a stowed position, in which it is arranged substantially parallel to and resting against the main element 2. Preferably, the friction in the hinges 4 is configured to be so high that the wing elements 3 are not displaced by themselves under application of normal use forces, so that once a position of the wing elements that has been set by the user, it is retained until the next adjustment operation.

FIG. 2 shows details of the wing element 3. This wing element 3 is connected to the main element 2 at two aligned hinges 4. These two hinges represent a rotation axis, in particular a vertical rotation axis, 12. The support structure of each wing element consists of two parts 3.1, 3.2, which are connected together during fitting, in particular when the respective pin 3.3 of a wing element part 3.1, 3.2 is inserted into the recess 4.1 in the main element 2. Preferably, this composite structure is secured by a securing means 8, for example a snap-action securing means.

FIG. 3 shows details of the hinge 4. Both the pin 3.3 and the recess 4.1 are configured at least in sections in the form of a truncated cone, such that the pin 3.3 is guided radially, and axially in one spatial direction. In order to prevent the pin from slipping by itself out of the recess 4.1, an axial stop 5 is provided. Preferably, this is a snap-action connection which is brought about when the pin is inserted into the recess. Preferably, the frustoconical surfaces 6 are configured such that sufficiently high friction is produced between the wing element and the main element. In order to prevent the wing element from being displaced beyond a certain angle, the head restraint according to the invention has a radial stop 7, which is provided both on the truncated cone and on the main element and prevents the wing element 3 from being turned beyond a certain angle.

LIST OF REFERENCE SIGNS

1 Head restraint
2 Main element
3 Wing element
3.1 First part of the wing element
3.2 Second part of the wing element
3.3 Pin on the wing element, pin for the hinge on the wing element
4 Hinge
4.1 Bore of the hinge, recess for the hinge in the main element
5 Axial stop
6 Frustoconical surface
7 Radial stop
8 Securing means, snap-action securing means
9 Holding rod of the head restraint
10 Seat occupant
11 Backrest
12 Rotation axis, vertical rotation axis

The invention claimed is:

1. A head restraint comprising:
   a main element; and
   two wing elements,
   wherein each wing element is fitted on the main element by at least two hinges so as to be rotatable about a vertical axis corresponding to the wing element,
   wherein each of the at least two hinges of a respective one of the wing elements has a rotation axis on the vertical axis corresponding to the wing element,
   wherein each hinge comprises a pin and a recess,
   wherein each of the recesses is configured to receive a corresponding one of the pins,
   wherein each of the pins and the recesses is provided in the form of a truncated cone,
   wherein each of the wing elements has two parts,
   wherein each of the two parts is provided with a corresponding one of the pins of the hinge,
   wherein the main element is provided with the recesses for receiving the pins,
   wherein the two parts of each wing element are configured to be fitted together while or after the pin of one of the two parts is inserted into the corresponding recess of the main element.

2. The head restraint as claimed in claim 1, wherein an axial stop is provided to prevent the pin from slipping out of the recess.

3. The head restraint as claimed in claim 1, wherein a securing mechanism is provided between the two parts.

4. A method for fitting a wing element on a main element in a head restraint, comprising:
   fitting two parts of the wing element on the main element through at least two hinges so as to be rotatable about a vertical axis corresponding to the wing element,
   wherein each hinge comprises a pin and a recess and has a rotation axis on the vertical axis corresponding to the wing element,
   wherein each of the two parts is provided with a corresponding one of the pins; and
   connecting the two parts together while or after fitting the two parts on the main element.

* * * * *